United States Patent [19]
Knoche et al.

[11] 4,039,651
[45] Aug. 2, 1977

[54] PROCESS FOR CLOSED-CYCLE THERMOCHEMICAL PRODUCTION OF HYDROGEN AND OXYGEN FROM WATER

[75] Inventors: Karl-Friedrich Knoche, Aachen; Johannes Schubert, Wurselen; Roland Schulze-Bentrop, Bonn, all of Germany

[73] Assignee: Rheinische Braunkohlenwerke AG, Cologne, Germany

[21] Appl. No.: 579,219

[22] Filed: May 20, 1975

[30] Foreign Application Priority Data

May 20, 1974 Germany .............................. 2424380

[51] Int. Cl.² .......................................... C01B 13/02
[52] U.S. Cl. .................................... 423/579; 423/658
[58] Field of Search .............. 423/579, 648, 657, 658, 423/656

[56] References Cited
U.S. PATENT DOCUMENTS

| 3,442,620 | 5/1969 | Huebler et al. | 423/658 |
| 3,821,358 | 6/1974 | Interrante et al. | 423/579 |
| 3,839,550 | 10/1974 | Wentorf, Jr. | 423/579 |
| 3,842,164 | 10/1974 | Wentorf, Jr. | 423/579 |

OTHER PUBLICATIONS

"Hydrogen Sought via Thermochemical Methods", Chemical and Engineering News, Sept. 1973, pp. 32 and 33.

*Primary Examiner*—Earl C. Thomas
*Attorney, Agent, or Firm*—Connolly and Hutz

[57] ABSTRACT

A closed-cycle multi-step thermochemical process is described for the production of hydrogen and oxygen from water. The disclosed process utilizes auxiliary compounds of the system iron-chlorine. By using the following two basic process steps:

a. reacting an iron oxide with hydrogen chloride or a mixture of hydrogen chloride and chlorine to form iron (II) chloride or iron (III) chloride and
 b. reacting iron or iron (II) oxide with water to form iron (II) oxide or iron (II) (III) oxide it is possible to employ a variety of additional steps so that the sum total of the reaction steps consume water, produce hydrogen and oxygen and regenerate the desired starting materials within the closed system.

2 Claims, 2 Drawing Figures

PROCESS FOR CLOSED-CYCLE THERMOCHEMICAL PRODUCTION OF HYDROGEN AND OXYGEN FROM WATER

BACKGROUND OF THE INVENTION

In view of the increased demand for energy supply several thermochemical processes for the production of hydrogen have been recently investigated. Common to almost all of these closed-cycle multi-step processes is the thermochemical decomposition of water into hydrogen and oxygen, simultaneously using various auxiliary compounds especially inorganic metallic salts, e.g., iron or copper compounds, and anions, e.g., sulfur or halides. However, the discovery of suitable closed-cycle processes, which mostly comprise four or more different steps and at the same time are technically and economically feasible, is rather difficult. Therefore out of the manifold of theoretically possible processes only a few practical reaction sequences have been selected and described, especially those using the systems: alkaline earth-mercury-bromine, iron-chlorine, chromium-chlorine, manganese-chlorine and iron-sulfur. Until now only a few specific combinations of certain reaction mechanisms have been proposed for decomposing water into its elements.

SUMMARY OF THE INVENTION

Now it has been found that in the frame work of closed-cycle multi-step processes there are certain basic reactions which, when employed, allow a much increased flexibility in choosing reaction sequences for closed-cycle multi-step processes for the production of hydrogen and oxygen from water. It is the prime object of this invention to utilize such basic reactions for the said closed-cycle multi-step processes.

Closed-cycle thermochemical processes for the production of hydrogen and oxygen from water are carried out in accord with this invention in at least four different chemical reaction steps by means of employing auxiliary compounds selected from the group consisting of iron oxides, iron chlorides, chlorine and hydrogen chloride whereby in one process step an iron oxide is reacted with hydrogen chloride or a mixture of hydrogen chloride and chlorine and in another process step iron or iron (II) oxide is reacted with water. Additional process steps are then selected to regenerate the starting materials for the two above described process steps and the sum of these reaction steps consumes water and generates the desired oxygen and hydrogen.

DETAILED DESCRIPTION OF THE INVENTION

Figure 1:
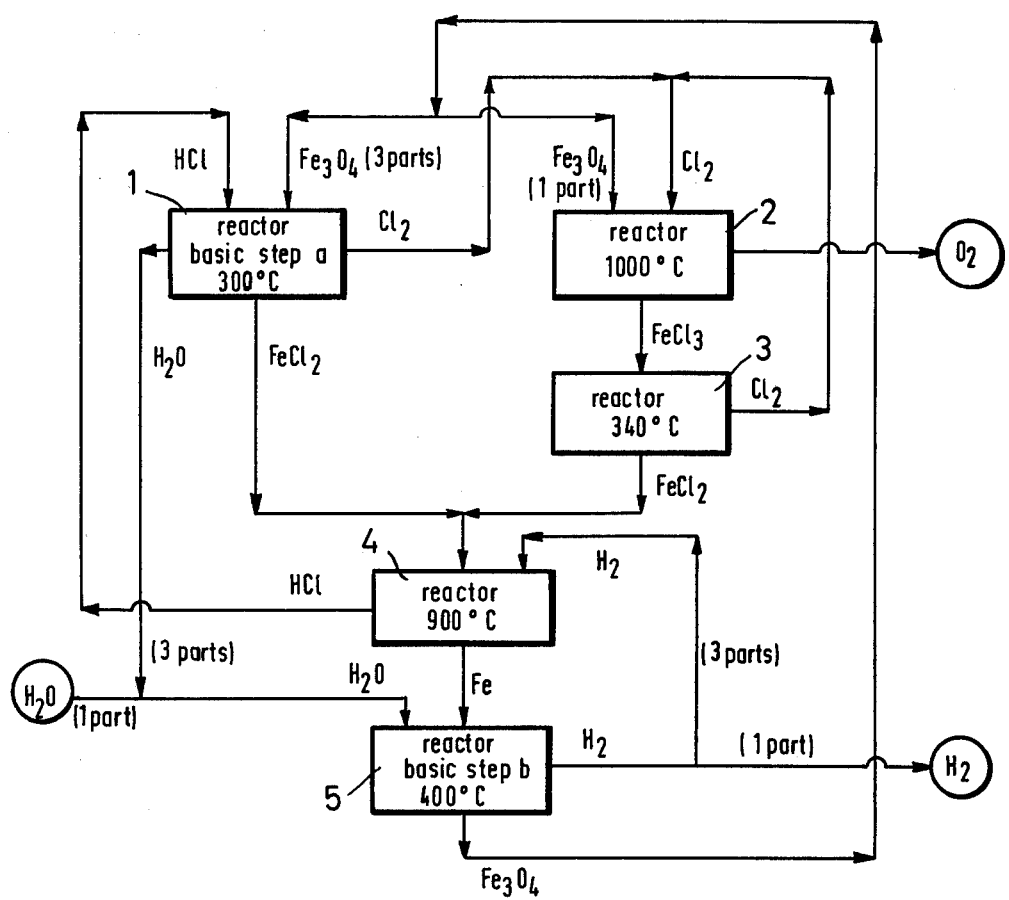

In addition to the defined auxiliary compounds no other agents are needed but as hereafter described, they may be optionally used.

The use of $Fe_3O_4$ has proven to be particularly advantageous when reacted with hydrogen chloride in the first basic reaction step. Two reaction mechanisms for this step are possible as shown in the following equations:

$$Fe_3O_4 + 8 HCl \rightarrow 3 FeCl_2 + Cl_2 + 4 H_2O \text{ or}$$

$$Fe_3O_4 + 8 HCl \rightarrow FeCl_2 + 2 FeCl_3 + 4 H_2O$$

$Fe_3O_4$ can also be reacted with a mixture of hydrogen chloride and chlorine according to $$2 Fe_3O_4 + 16 HCl + Cl_2 \rightarrow 6 FeCl_3 + 8 H_2O$$

Instead of $Fe_3O_4$, other iron oxides may be reacted with hydrogen chloride in the first basic reaction in accord with equations:

$$FeO + 2 HCl \rightarrow FeCl_2 + H_2O \text{ resp.}$$

$$Fe_2O_3 + 6 HCl \rightarrow 2 FeCl_2 + Cl_2 + 3 H_2O$$

As is known these reactions can be carried out at elevated temperatures for example of about 130° to 480° C., and when chlorine is used in addition to hydrogen chloride, at around 330° to 830° C.

The second basic reaction, i.e., the reaction of Fe or FeO with water may be carried out according to the equations:

$$3 Fe + 4 H_2O \rightarrow Fe_3O_4 + 4 H_2 \text{ or}$$

$$3 FeO + H_2O \rightarrow Fe_3O_4 + H_2$$

The second basic reaction can be run in a different way too, e.g., according to the equation:

$$Fe + H_2O \rightarrow FeO + H_2$$

These are also well-known reactions per se which can be carried out at elevated temperatures such as at about 300° to 1000° C.

In certain cases other compounds can participate in these basic reactions, e.g., oxygen when FeO is reacted with HCl, or $FeCl_3$ when FeO is reacted with water. Of course, it is possible to run all these reactions at elevated pressure say up to about 100 atmospheres gauge. This is particularly useful when the heat capacity of a cooling agent used in a high temperature nuclear reactor is used to provide the heat requirements of the strongly endothermic reactions, e.g., reaction of Fe with water. In this case one would normally carry out the corresponding process steps at the pressure of the cooling agent, e.g., 40 atmospheres gauge.

In general in selecting the additional process steps to regenerate the starting materials for the basic reactions, one tends to employ as few reaction steps as possible for the closed-cycle processes. However, under certain conditions, it may be more favorable to turn to a higher number of reaction steps, if otherwise the expenditure for the process becomes too high. All additional reaction steps, which are in principle the known thermodynamically possible reactions, can be carried out in the usual manner. One will work in a conventional manner at temperatures ranging from 200° to 1100° C. Reactions of the iron oxides with chlorine are carried out at about 450° to 1050° C, those with iron (III) oxides and hydrogen chloride at about 200° to 450° C. The temperature range for the conversion of the iron (II) chloride with water is about 650° to 1100° C. while cleaving of the iron (III) chloride is advantageously carried out at 300° to 450° C. All other reactions occuring in the process will be performed in the stated temperature ranges, e.g., conversion of chlorine and water at about 750° to 1100° C. By employing the two basic reactions, it is possible to run the entire process in many different variations so that narrow restrictions in the choice of a particular reaction sequence—as was the case up till now—can be eliminated.

In the following summary examples, the most essential possibilities for building up such closed-cycle multi-step processes are given. It is understood however that other processes will occur to one skilled in the art and the invention is not limited to the specific reactions (other than the basic reactions) described. It will be seen by simple calculations that the sum of the reactions described in the examples results in a consumption of water and the production of hydrogen and oxygen.

The reactions hereafter described can be carried out in the usual reactors and by means well known in the art. Recovery of the regenerated starting materials from the reactions is accomplished in the normal manner. The yields are practically theoretical because the formation of by-products is very small.

I. Closed-cycle multi-step processes including reactions between $Fe_3O_4$ and HCl or HCl and $Cl_2$:

A.
$2\ Fe_3O_4 + 16\ HCl \rightarrow 6\ FeCl_2 + 2\ Cl_2 + 8\ H_2O$
$2\ Cl_2 + 2\ H_2O \rightarrow 4\ HCl + O_2$
$6\ FeCl_2 + 6\ H_2 \rightarrow 6\ Fe + 12\ HCl$
$6\ Fe + 8\ H_2O \rightarrow 2\ Fe_3O_4 + 8\ H_2$ B.
$6\ Fe_3O_4 + 48\ HCl \rightarrow 18\ FeCl_2 + 6\ Cl_2 + 24\ H_2O$
$2\ Fe_3O_4 + 9\ Cl_2 \rightarrow 6\ FeCl_3 + 4\ O_2$
$6\ FeCl_3 \rightarrow 6\ FeCl_2 + 3\ Cl_2$
$24\ FeCl_2 + 24\ H_2 \rightarrow 24\ Fe + 48\ HCl$
$24\ Fe + 32\ H_2O \rightarrow 8\ Fe_3O_4 + 32\ H_2$ C.
$6\ Fe_3O_4 + 48\ HCl \rightarrow 6\ FeCl_2 + 12\ FeCl_3 + 24\ H_2O$
$2\ Fe_2O_4 + 9\ Cl_2 \rightarrow 6\ FeCl_3 + 4\ O_2$
$18\ FeCl_3 \rightarrow 18\ FeCl_2 + 9\ Cl_2$
$24\ FeCl_2 + 24\ H_2 \rightarrow 24\ Fe + 48\ HCl$
$24\ Fe + 32\ H_2O \rightarrow 8\ Fe_3O_4 + 32\ H_2$ D.
$2\ Fe_3O_4 + 16\ HCl \rightarrow 2\ FeCl_2 + 4\ FeCl_3 + 8\ H_2O$
$4\ FeCl_3 \rightarrow 4\ FeCl_2 + 2\ Cl_2$
$6\ FeCl_2 + 6\ H_2 \rightarrow 6\ Fe + 12\ HCl$
$2\ Cl_2 + 2\ H_2O \rightarrow 4\ HCl + O_2$
$6\ Fe + 8\ H_2O \rightarrow 2\ Fe_3O_4 + 8\ H_2$ E.
$6\ Fe_3O_4 + 48\ HCl + 3\ Cl_2 \rightarrow 18\ FeCl_3 + 24\ H_2O$
$2\ Fe_3O_4 + 9\ Cl_2 \rightarrow 6\ FeCl_3 + 4\ O_2$
$24\ FeCl_3 \rightarrow 24\ FeCl_2 + 12\ Cl_2$
$24\ FeCl_2 + 24\ H_2 \rightarrow 24\ Fe + 48\ HCl$
$24\ Fe + 32\ H_2O \rightarrow 8\ Fe_3O_4 + 32\ H_2$ F.
$2\ Fe_3O_4 + 16\ HCl + Cl_2 \rightarrow 6\ FeCl_3 + 8\ H_2O$
$6\ FeCl_3 \rightarrow 6\ FeCl_2 + 3\ Cl_2$
$6\ FeCl_2 + 6\ H_2 \rightarrow 6\ Fe + 12\ HCl$
$2\ Cl_2 + 2\ H_2O \rightarrow 4\ HCl + O_2$
$6\ Fe + 8\ H_2O \rightarrow 2\ Fe_3O_4 + 8\ H_2$ G.
$2\ Fe_3O_4 + 16\ HCl \rightarrow 6\ FeCl_2 + 2\ Cl_2 + 8\ H_2O$
$2\ Cl_2 + 2\ H_2O \rightarrow 4\ HCl + O_2$
$6\ FeCl_2 + 2\ H_2O \rightarrow 6\ FeO + 12\ HCl$
$6\ FeO + 2\ H_2O \rightarrow 2\ Fe_3O_4 + 2\ H_2$ H.
$2\ Fe_3O_4 + 16\ HCl \rightarrow 6\ FeCl_2 + 2\ Cl_2 + 8\ H_2O$
$2\ Cl_2 + 2\ FeO \rightarrow 2\ FeCl_3 + O_2$
$2\ FeCl_3 \rightarrow 2\ FeCl_2 + Cl_2$
$8\ FeCl_2 + 8\ H_2O \rightarrow 8\ FeO + 16\ HCl$
$6\ FeO + 2\ H_2O \rightarrow 2\ Fe_3O_4 + 2\ H_2$ I.
$6\ Fe_3O_4 + 48\ HCl \rightarrow 18\ FeCl_2 + 6\ Cl_2 + 24\ H_2O$
$2\ Fe_3O_4 + 9\ Cl_2 \rightarrow 6\ FeCl_3 + 4\ O_2$
$6\ FeCl_3 \rightarrow 6\ FeCl_2 + 3\ Cl_2$
$24\ FeCl_2 + 24\ H_2O \rightarrow 24\ FeO + 48\ HCl$
$24\ FeO + 8\ H_2O \rightarrow 8\ Fe_3O_4 + 8\ H_2$ J.
$2\ Fe_3O_4 + 16\ HCl \rightarrow 6\ FeCl_2 + 2\ Cl_2 + 8\ H_2O$
$6\ FeCl_2 + 6\ H_2 \rightarrow 6\ Fe + 12\ HCl$
$2\ Cl_2 + 2\ H_2O \rightarrow 4\ HCl + O_2$
$6\ Fe + 6\ H_2O \rightarrow 6\ FeO + 6\ H_2$
$6\ FeO + 2\ H_2O \rightarrow 2\ Fe_3O_4 + 2\ H_2$ K.
$2\ Fe_3O_4 + 16\ HCl \rightarrow 2\ FeCl_2 + 4\ FeCl_3 + 8\ H_2O$
$2\ FeCl_2 + 8\ H_2O \rightarrow 8\ FeO + 16\ HCl$
$2\ FeO + 3\ Cl_2 \rightarrow 2\ FeCl_3 + O_2$
$6\ FeCl_3 \rightarrow 6\ FeCl_2 + 3\ Cl_2$
$6\ FeO + 2\ H_2O \rightarrow 2\ Fe_3O_4 + 2\ H_2$ L.
$6\ Fe_3O_4 + 48\ HCl \rightarrow 6\ FeCl_2 + 12\ FeCl_3 + 24\ H_2O$
$2\ Fe_3O_4 + 9\ Cl_2 \rightarrow 6\ FeCl_3 + 4\ O_2$
$18\ FeCl_3 \rightarrow 18\ FeCl_2 + 9\ Cl_2$
$24\ FeCl_2 + 24\ H_2O \rightarrow 24\ FeO + 48\ HCl$
$24\ FeO + 8\ H_2O \rightarrow 8\ Fe_3O_4 + 8\ H_2$ M.
$2\ Fe_3O_4 + 16\ HCl \rightarrow 2\ FeCl_2 + 4\ FeCl_3 + 8\ H_2O$
$4\ FeCl_3 \rightarrow 4\ FeCl_2 + 2\ Cl_2$
$6\ FeCl_2 + 6\ H_2O \rightarrow 6\ FeO + 12\ HCl$
$2\ Cl_2 + 2\ H_2O \rightarrow 4\ HCl + O_2$
$6\ FeO + 2\ H_2O \rightarrow 2\ Fe_3O_4 + 2\ H_2$ N.
$2\ Fe_3O_4 + 16\ HCl + Cl_2 \rightarrow 6\ FeCl_3 + 8\ H_2O$
$3\ Cl_2 + 2\ FeO \rightarrow 2\ FeCl_3 + O_2$
$8\ FeCl_3 \rightarrow 8\ FeCl_2 + 4\ Cl_2$
$8\ FeCl_2 + 8\ H_2O \rightarrow 8\ FeO + 16\ HCl$
$6\ FeO + 2\ H_2O \rightarrow 2\ Fe_3O_4 + 2\ H_2$ O.
$6\ Fe_3O_4 + 48\ HCl + 3\ Cl_2 \rightarrow 18\ FeCl_3 + 24\ H_2O$
$2\ Fe_3O_4 + 9\ Cl_2 \rightarrow 6\ FeCl_3 + 4\ O_2$
$24\ FeCl_3 \rightarrow 24\ FeCl_2 + 12\ Cl_2$
$24\ FeCl_2 + 24\ H_2O \rightarrow 24\ FeO + 48\ HCl$
$24\ FeO + 8\ H_2O \rightarrow 8\ Fe_3O_4 + 8\ H_2$ P.
$2\ Fe_3O_4 + 16\ HCl + Cl_2 \rightarrow 6\ FeCl_3 + 8\ H_2O$
$6\ FeCl_3 \rightarrow 6\ FeCl_2 + 3\ Cl_2$
$6\ FeCl_2 + 6\ H_2O \rightarrow 6\ FeO + 12\ HCl$
$2\ Cl_2 + 2\ H_2O \rightarrow 4\ HCl + O_2$
$6\ FeO + 2\ H_2O \rightarrow 2\ Fe_3O_4 + 2\ H_2$ II. Closed-cycle, multi-step processes employing other combinations:

A.
$2\ Fe_3O_4 + 16\ HCl \rightarrow 6\ FeCl_2 + 2\ Cl_2 + 8\ H_2O$
$6\ FeCl_2 + 6\ Fe_3O_4 + 6\ H_2 \rightarrow 24\ FeO + 12\ HCl$
$24\ FeO \rightarrow 6\ Fe + 6\ Fe_3O_4$
$2\ Cl_2 + 2\ H_2O \rightarrow 4\ HCl + O_2$
$6\ Fe + 8\ H_2O \rightarrow 2\ Fe_3O_4 + 8\ H_2$ B.
$36\ Fe_3O_4 + 288\ HCl \rightarrow 108\ FeCl_2 + 36\ Cl_2 + 144\ H_2O$
$8\ Fe_3O_4 + 36\ Cl_2 \rightarrow 24\ FeCl_3 + 16\ O_2$
$108\ FeCl_2 + 108\ H_2 \rightarrow 108\ Fe + 216\ HCl$
$105\ Fe + 140\ H_2O \rightarrow 35\ Fe_3O_4 + 140\ H_2$
$3\ Fe + 36\ H_2O + 24\ FeCl_3 \rightarrow 9\ Fe_3O_4 + 72\ HCl$ C.
$3\ Fe_3O_4 + 24\ HCl \rightarrow 9\ FeCl_2 + 3\ Cl_2 + 12\ H_2O$
$3\ Cl_2 + 2\ FeO \rightarrow 2\ FeCl_3 + O_2$
$2\ FeCl_3 + 4\ FeO \rightarrow 3\ FeCl_2 + Fe_3O_4$
$12\ FeCl_2 + 12\ H_2O \rightarrow 12\ FeO + 24\ HCl$
$6\ FeO + 2\ H_2O \rightarrow 2\ Fe_3O_4 + 2\ H_2$ D.
$3\ Fe_3O_4 + 24\ HCl \rightarrow 9\ FeCl_2 + 3\ Cl_2 + 12\ H_2O$
$9\ Fe_3O_4 + 9\ FeCl_2 + 9H_2 \rightarrow 36\ FeO + 18\ HCl$
$2\ FeO + 3\ Cl_2 \rightarrow 2\ FeCl_3 + O_2$
$FeO + 3\ H_2O + 2\ FeCl_3 \rightarrow Fe_3O_4 + 6\ HCl$
$33\ FeO + 11\ H_2O \rightarrow 11\ Fe_3O_4 + 11\ H_2$ III. Closed-cycle multi-step processes including other iron-oxides, the addition of other compounds and reactions of iron with water thus forming iron (II) oxide:

A.
$3\ Fe_2O_3 + 18\ HCl \rightarrow 6\ FeCl_2 + Cl_2 + 9\ H_2O$
$6\ FeCl_2 + 6\ H_2 \rightarrow 6\ Fe + 12\ HCl$
$2\ Fe_3O_4 + Cl_2 + H_2O \rightarrow 2\ Fe_2O_3 + 2\ HCl$
$2\ Cl_2 + 2\ H_2O \rightarrow 4\ HCl + O_2$
$6\ Fe + 8\ H_2O \rightarrow 2\ Fe_3O_4 + 8\ H_2$ B.
$2\ Fe_3O_4 + 16\ HCl \rightarrow 6\ FeCl_2 + 2\ Cl_2 + 8\ H_2O$
$6\ FeCl_2 + 6\ H_2O \rightarrow 6\ FeO + 12\ HCl$
$2\ Cl_2 + 2\ H_2O \rightarrow 4\ HCl + O_2$
$8\ FeO \rightarrow 2\ Fe + 2\ Fe_3O_4$
$2\ Fe + 2\ H_2O \rightarrow 2\ FeO + 2\ H_2$ Schematic flow diagrams for two closed-cycle process variants are shown in FIGS. 1 and 2:

According to FIG. 1 the first basic process step is carried out in reactor 1 at about 300° C. 75% of the total amount of $Fe_3O_4$ to be converted is reacted with HCl to $FeCl_2$, $Cl_2$ and $H_2O$. This $Cl_2$ will be combined with the $Cl_2$ obtained in reactor 3 and then transfered to reactor 2, where it reacts with the other 25% of $Fe_3O_4$ at a temperature of about 1000° C. forming $O_2$, which is removed from the process, as well as $FeCl_3$. $FeCl_3$ is cleaved into $FeCl_2$ and $Cl_2$ in reactor 3 at a temperature of about 340° C., the resulting $Cl_2$ is fed into reactor 2.

$FeCl_2$ orginating from reactors 1 and 3 is reduced to iron by hydrogen in reactor 4 at about 900° C. HCl formed in this reaction is conducted to reactor 1. Carrying out the basic reaction *b* the iron formed is reacted with $H_2O$ to $Fe_3O_4$ in reactor 5, $Fe_3O_4$ being recycled to reactors 1 and 3. 75% of the water converted in reactor 5 originates from reactor 1, while 25% is constantly introduced into the process in the form of fresh water. Hydrogen produced in the course of the formation of $Fe_3O_4$ is partly used for reducing the $FeCl_2$ in reactor 4, the rest is removed from the process in stoichiometric quantities relative to the removed oxygen.

Figure 2:
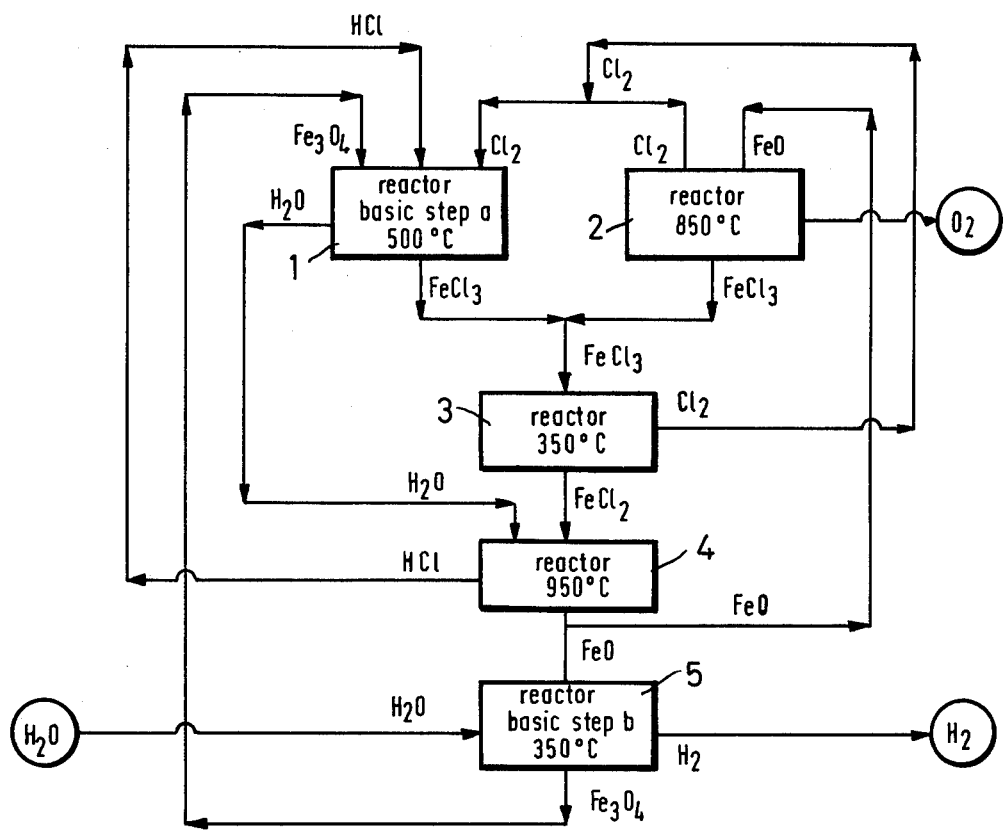

According to FIG. 2 the basic process step *a*, i.e., reaction of $Fe_3O_4$ with HCl and $Cl_2$ at 500° C. is carried out in reactor 1. An additional iron oxide, i.e., FeO, is reacted with chlorine in reactor 2 thereby giving oxygen which is removed from the process. $FeCl_3$ obtained in reactors 1 and 2 is converted to $Cl_2$ and $FeCl_2$ in reactor 3. 25% of the obtained $Cl_2$ is led to reactor 1, 75% led to reactor 2. $FeCl_2$ is transfered to reactor 4. Here it reacts at about 950° C. with water originating from reactor 1 resulting in the formation of HCl (fed back to reactor 1) and FeO. 25% of the of the formed FeO is conducted to reactor 2, 75% are led to reactor 5, where at a temperature of 350° C. and by adding fresh water re-formation of $Fe_3O_4$ takes place, which again is recycled to reactor 1. Hydrogen formed in the course of the process is removed.

What is claimed is:

1. In the process for the production of hydrogen and oxygen from water by means of a thermochemical closed-cycle multi-step process conducted at temperatures of between about 130° – 1100° C utilizing at least one member selected from the group consisting of iron oxides, iron chlorides, chlorine and hydrogen chloride as an auxiliary compound, the improvement which comprises employing the steps of:

a. reacting water with a member selected from the group consisting of iron and iron (II) oxide at a temperature between 300°-1000° C. in one process step thereby forming hydrogen and a member selected from the group consisting of iron (II, III) oxide and iron (II) oxide, separating and recovering the thus obtained reaction products;
   b. reacting at least part of the iron oxide formed in step (a) with hydrogen chloride at a temperature of between about 130° – 830° C. in a subsequent process step thereby forming a member selected from the group consisting of iron (II) chloride and iron (III) chloride, separating and recovering the thus obtained reaction products;
   c. re-forming the starting material selected from the group consisting of iron and iron (II) oxide for process step (a) by converting at least one of said iron chlorides obtained in step (b) to said iron or iron (II) oxide in at least two additional process steps one of the steps being the reaction of a compound selected from the group consisting of iron (II) oxide, iron (II, III) oxide and water with chlorine at a temperature of between about 450 °– 1050° C, whereby iron (III) chloride or hydrogen chloride and oxygen are formed, and the second step being the reaction of iron (II) chloride with hydrogen or water, whereby hydrogen chloride is obtained, employing in any further reaction as reactant at least one member selected from the group consisting of iron oxides, iron (III) chloride, chlorine and water, and recycling the so obtained iron or iron (II) oxide into process step (a);
   d. separating and recovering at least part of said hydrogen formed in step (a) and oxygen as end products.

2. The process of claim 1, wherein in process step (b) iron (II, III) oxide is reacted with a mixture of hydrogen chloride and chlorine.

* * * * *